1,917,289

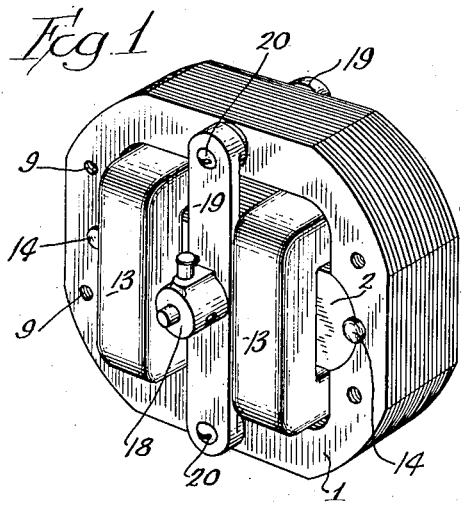
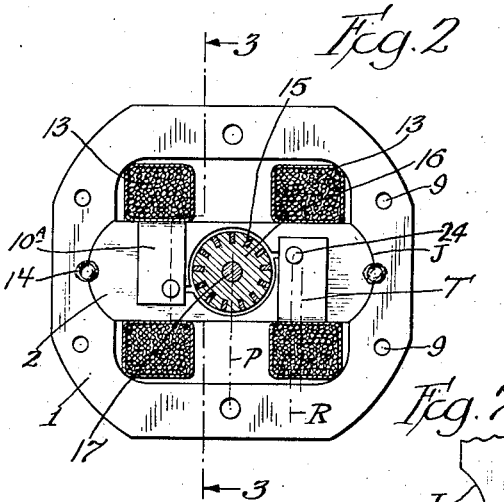
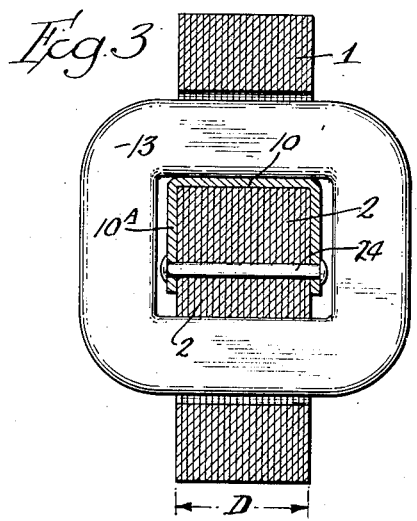
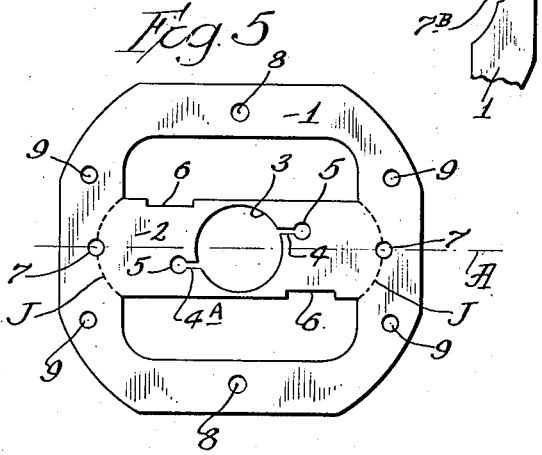
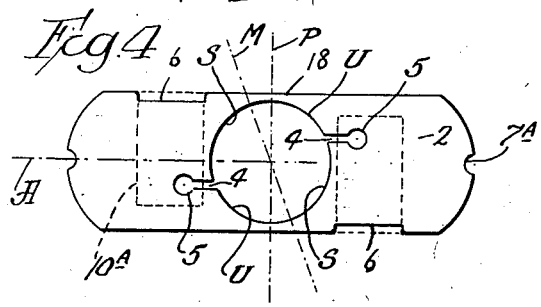
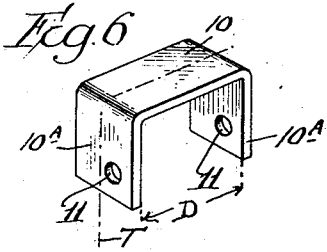
Inventor:
Bernhart A. Benson Patented July 11, 1933

UNITED STATES PATENT OFFICE

BERNHART A. BENSON, OF CHICAGO, ILLINOIS, ASSIGNOR TO CHICAGO ELECTRIC MANUFACTURING COMPANY, OF CHICAGO, ILLINOIS, A CORPORATION OF ILLINOIS

SELF-STARTING INDUCTION MOTOR

Application filed December 17, 1931. Serial No. 581,612.

My invention relates to induction motors, and more particularly to two-pole induction motors of the shaded pole type.

Generally speaking, the objects of my invention include a simplifying, expediting and cheapening of the manufacture of laminated stators of the inner-pole type; also, the employing of shading rings as the means for holding laminations in assembled relation; and the providing of a novel shape and disposition of shading rings for effectively functioning in connection with magnetically interconnected opposite poles of the stator.

For small induction motors of the general class used in electric clocks and in small fan motors, it has heretofore been customary (when laminated stator cores were desired) to employ a stator core consisting entirely of a frame having two generally parallel sides, one of which frame sides is perforated to afford the two stator poles while the opposite frame side extends through the magnetizing coil of the stator, this type being sometimes designated as a "core type."

When a prewound stator coil is to be used, so as to eliminate the difficulty and expense of a hand-wound coil, a stator core of this type usually requires two or three joints in it, so as to permit part of the core to be slid through this coil, thereby increasing the cost of manufacture. Where the stator of a small motor consists of frame-like laminations, each of which has a rotor-receiving perforation in one frame side, it also has heretofore been customary to make each such lamination of a single piece having a cut across another frame side, thereby permitting one frame side to be bent out of the general plane of the frame so that the stator coil can be slid over a frame side. However, the assembly of the stator then requires the back and forth bending of each lamination, and the effect of the double bending tends to make the laminations spring apart after they are assembled, so that a large number of bolts are needed to insure a rigid assembly of these laminations.

Moreover, with stator cores of the just described frame type, the axis of the armature extends through one side of the frame, and not centrally of the frame, so that this type will not permit the use of a compact casing when the armature of the motor is to extend axially of the casing.

Moreover, with such a "core type" stator, the magnetizing coil of the stator has to be disposed far from each pole of the stator, so that its efficiency cannot be as high as that of two coils respectively adjacent to the two poles.

To overcome all of the above recited objections to the socalled "core type" stators, I provide a stator core consisting of a frame and a separately formed cross-bar spanning this frame; the cross-bar being formed for affording two opposed poles and adapted to be slidably inserted in the frame member after two stator coils have been slid upon it. Then I also provide the cross-bar and the frame with interfitting portions for holding these parts in predetermined relation, and provide novel means for securing them to each other. In addition, I provide a novel shading ring construction and shape for effecting a progressive shading of each pole with a single such ring.

When the stator is to be of a laminated form, I provide separate sets of laminations for the frame and for the cross-bar, employ the shading rings as the means for alining and holding the cross-bar laminations in assembled relation, and clamp the resulting cross-bar to the frame-lamination assembly by the same means which fasten the cross-bar to the frame.

Still further and more detailed objects of my invention will appear from the following specification and from the accompanying drawing, in which drawing Fig. 1 is a perspective view of an induction motor embodying my invention and having a laminated stator core.

Fig. 2 is a vertical section taken in the plane of the forward face of the stator core.

Fig. 3 is an enlarged transverse vertical section, taken along the line 3—3 of Fig. 2.

Fig. 4 is an enlarged front elevation of one of the stator laminations, with dotted lines showing the relative positions of the clip portions of the two shading rings.

Fig. 5 is an elevation, drawn on the same scale as Figs. 1 and 2 and showing a stator frame blank and a stator lamination blank while still integral with each other after the initial punch press operation in forming both of these.

Fig. 6 is a perspective view of the clip portion of one of the shading rings, drawn on the same scale as Fig. 3.

Fig. 7 is a fragmentary elevation of one end of the frame of the stator.

In constructing the here illustrated induction motor, I first blank out counterpart stator frame laminations 1 and counterpart stator cross-bar laminations 2 of the same number and thickness, with the inner edges of two opposite frame sides of each lamination recessed to interfit the ends of a cross-bar lamination.

To insure this interfitting and to reduce the amount of sheet iron stock needed for both sets of lamination, I preferably first punch lamination blanks as shown in full lines in Fig. 5, thereby initially forming each blank as a generally rectangular frame having an integral cross-bar connecting medial portions of its frame ends. During this same initial punching operation I desirably also punch the following essential formations:

The central cross-bar perforation 3 for the rotor of the motor; the pole-dividing slots 4 and 4A extending from the central perforation 3 and parallel to and at opposite sides of the axis A of the cross-bar; the relatively smaller perforations 5 at the outer ends of these slots for receiving the rivet portions of two shading rings; and the oppositely disposed edge notches 6 for receiving the backs of the clip portions of the two shading rings.

During this initial blanking operation I also punch two rivet holes 7 each extending through one end of the frame and across the proposed line of juncture J between that end of the finished stator frame and the adjacent end of the finished stator cross-bar, this juncture line being desirably outwardly convexed as shown in dotted lines in Fig. 5. In addition, I punch perforations 8 in the upper and lower frame sides with their axes in a plane diametric of the central perforation 3 and at right angles to the cross-bar axis A, for receiving bolts which support the bearing brackets for the shaft of the motor; and auxiliary frame end perforations 9 to afford bores in the stator for connecting the latter to its casing and its support.

After each lamination blank has been thus punched, a single second punch-press operation with a punch having cutting edge portions conforming to the dotted lines J severs the cross-bar lamination (in its finished form as shown in Fig. 4) from the also finished stator frame lamination. By proceeding in this manner, only two punching operations are required for each lamination as shown in Fig. 2.

Thus constructed, each of the cross-bar punchings forms one of the counterpart laminations for a cross-bar which will afford two opposed and integrally interconnected pole-pieces, each pole-piece having its face end divided by one of the slots (4 or 4A) into two pole teeth U and S. After the needed number of the cross-bar laminations have been stacked on one another, I slip over this assembly from opposite edges thereof two U-shaped copper clips each of which has its back 10 of a width corresponding to the width of one of the edge notches 6 and has the opposed faces of its shanks 10A spaced by a distance D corresponding to the total thickness of the stacked laminations.

Each of these clips, as shown separately in Fig. 6, also has its shanks provided with alined perforations 11 located so that both of these perforations will aline with the slot-end bore 5 in one longitudinal half of the bar when the back of the clip seats on the bottom of the corresponding edge groove 6 in the laminations. Then I connect the two shanks of each clip by a copper rivet 24 which snugly fits the bore of the slot-end perforation 5 through which the rivet also extends. When thus attached, the two shading rings aline the cross-bar laminations with one another and constitute the sole means for holding these laminations in rigidly assembled relation in the form of a cross-bar having a central bore 3 at right angles to the faces of the laminations.

Each end of the resulting rigid cross-bar then has a prewound stator coil 13 tightly slipped upon it at a clear spacing from the axis of the said bore 3 of more than the radius of that bore, after which the resulting cross-bar and coil assembly is slid into a corresponding stack of superposed (but otherwise still unconnected) stator frame laminations 1, with the rounded ends of the cross-bars engaging the recesses 5 in opposite sides of the stator frame.

When I insert a rivet 14 in each of supplemental bores 7 at the junctures of the cross-arm ends with the frame, each of which supplemental bores has its wall formed jointly by a recess 7A in the adjacent end member of the frame (Fig. 5) and partly by an arm-end recess 7A (Fig. 4). By using iron rivets snugly fitting these supplemental bores and clinching each rivet end so that its head overlaps and bears tightly against portions of both a cross-arm end and the adjacent frame side, I readily secure a rigid assembly. And by starting with cross-arm ends and frame-side recesses accurately fitting each other, as necessarily follows from my procedure in severing the cross-arm laminations from a blank like that of Fig. 5, I secure such an abutting of these parts as to eliminate all air gaps in the magnetic circuits of the stator. Moreover, the iron rivets 14 then also prevent the ends of the cross-bar laminations from springing apart.

In the resulting assembly, each pole portion S which is embraced by one of the shading rings becomes a shaded pole as soon as current flows through the stator coils 13. This shaded pole is connected to an unshaped portion U of the opposite pole by a bridging portion of the cross-arm which extends across a plane P diametric of the central perforation in the cross-bar and at right angles to the axis A of the cross-bar. Consequently, the magnetic flux from the shaded pole S toward the unshaded pole connected to it will lag in phase, and magnetic flux from the unshaded pole will flow past the said plane; thereby shifting the effective median plane between the poles, as for example to the median plane M in Fig. 4, to an automatic starting of the motor at a considerable torque.

To avoid a reduction in the efficiency of the motor by an excessive magnetic flux past the mechanically medial plane P between the two poles, I make the width of the central portion of the stator cross-arm only sufficiently wider than the diameter of the central (rotor-receiving) perforation to afford mechanical rigidity. I also preferably dispose the central portions 18 of both edges of the cross-bar parallel to the medial axis of the cross-bar, so that the width of each bridging connection between two opposite poles continuously diminishes toward the mechanically medial plane P, instead of making such bridges of a uniform width alongside a considerable arc of the rotor after the manner of earlier practice.

Having found by long experiments that a single shading ring of uniform width will not cooperate with a bridging connection of the here disclosed shaping, I desirably employ as a shading ring a clip and rivet assembly in which the diameter of the rivet is much smaller than the width of the clip, and in which the axis R of this rivet is considerably nearer to the mechanical median plane P of the cross-bar than the median plane T (Fig. 2) of the shanks of the clip. By doing this, I distribute the shading effect over a portion of each pole much longer than the diameter of the rivet, so as to produce a progressive shading of the pole without requiring the use of plural shading rings for that purpose.

With the stator frame, cross-bar, shading rings and oppositely wound stator coils thus assembled, a supply of alternating current to these coils produces a rotating field in the central bore of the cross-bar, for rotating any rotor responsive to such a field. In practice, I desirably employ a squirrel cage rotor having copper bars 15 disposed in slots along the periphery of an iron rotor core 16 fastened to a shaft 17. Then I journal each projecting end portion of this shaft in a bearing 18 on a bracket 19 fastened to the stator frame by bolts 20 extending through the perforations 8 in the stator frame laminations, thereby utilizing initial formations in the lamination blanks for alining the rotor with the stator, and eliminating the need of all boring or other machining on any part of either the stator or the rotor.

However, while I have heretofore described my invention in an embodiment including numerous desirable details of construction and arrangement, I do not wish to be limited in these respects, since many changes might obviously be made without departing either from the spirit of my invention or from the appended claims.

I claim as my invention:

1. A stator core for an electric motor, comprising an iron frame, and a separately formed cross-bar extending medially across the frame and abutting at its ends against the frame, the cross-bar having a central perforation for receiving the rotor of the motor, the axis of the perforation being at right angles to the general plane of the frame.

2. A stator core as per claim 1, in which the cross-bar has generally flat two edges parallel to the axis of the said perforation, which edges approach opposite sides of the said perforation by a distance corresponding to a small fraction of the radius of the perforation.

3. A stator core as per claim 1, in which each cross-bar end and the frame part abutting against that end have complementary recesses jointly constituting a supplemental bore extending parallel to the axis of the perforation in the cross-bar; and two fastening members each extending through one of the supplemental bores and having at each end a head engaging portions of both the cross-bar and the frame.

4. A stator core as per claim 1, in which the ends of the cross-bar and the frame portions against which these ends abut are of non-planular and slidably interfitting formation to permit the cross-bar to be slid into the frame in a predetermined position by a movement at right angles to the general plane of the frame.

5. A stator core for an electric motor, comprising a frame, and a cross-bar spanning the frame and abutting at its ends against two opposite sides of the frame; the cross-bar being formed to present two opposed pole pieces and having two opposite longitudinal edges corresponding in length to the interior length of the frame, each end of the cross-bar being outwardly convexed in a section longitudinal of the cross-bar and at right angles to the said edges, each end of the frame having in its inner edge a recess conforming to the curvature of the adjacent end of the cross-bar.

6. In an induction motor, a stator core comprising a generally rectangular frame and a separately formed cross-bar of equal thickness with the frame, the cross-bar abutting at its ends against two opposite sides of the frame and extending medially between the other two frame sides; the cross-bar being provided with a central perforation having its axis extending at right angles to the general plane of the frame, and having in each end a groove extending parallel to the said axis; each of the first named frame sides having in its inner face a groove cooperating with the groove in the adjacent end of the cross-bar to form a supplemental bore; and two fastening members each extending through one of the supplemental bores and having a head at each end, each such head overlapping adjacent portions of both the frame and the cross-bar to aline the frame planularly with the cross-bar.

7. A stator core as per claim 6, in which the frame is composed of counterpart laminations having their faces disposed in planes at right angles to the axes of the said perforation and bores, and in which the said fastening members fasten the said frame laminations to each other.

8. In an alternating current motor, a stator core comprising an iron frame, a separately formed cross-bar spanning the said frame and provided with a central perforation having its axis at right angles to the general plane of the frame, a rotor disposed within and coaxial with the said perforation, two stator coils sleeved upon the cross-bar respectively at opposite sides of the rotor; the frame including two opposite frame sides against which the ends of the cross-bar respectively abut, the cross-bar being slidably insertible in the frame by a relative movement thereof parallel to the axis of the perforation to permit an assembling of the frame and the cross-bar after the stator coils have been sleeved upon the cross-bar; and means operatively connecting the said frame and cross-bar to hold them in a common general plane at right angles to the said axis.

9. In a stator core for an electric motor, comprising a frame and a cross-bar spanning the frame; the cross-bar being provided with a central bore at right angles to the general plane of the frame and having the ends of the cross-bar abutting against opposite ends of the frame; each cross-bar end and the frame part abutting against that end having complementary recesses jointly constituting a supplemental bore having its axis parallel to the axis of the said central bore; and two fastening members each extending through one of the supplemental bores and having at each end a head engaging portions of both the cross-bar and the frame; the stator core frame being composed of counterpart laminations having their faces extending in planes at right angles to the axes of the said bores, and the said fastening members serving also to hold these laminations in assembled relation to each other.

Signed at Chicago, Illinois, December 11th, 1931.

BERNHART A. BENSON.